(12) United States Patent
Verduijn et al.

(10) Patent No.: US 6,517,807 B2
(45) Date of Patent: Feb. 11, 2003

US006517807B2

(54) PREPARATION OF HIGH SILICA ZEOLITES BOUND BY ZEOLITE AND USE THEREOF

(75) Inventors: Johannes P. Verduijn, deceased, late of Oostvoorne (NL), Jannetje Maatje van den Berge, legal representative; Gary David Mohr, League City, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/992,783

(22) Filed: Nov. 14, 2001

(65) Prior Publication Data

US 2002/0115555 A1 Aug. 22, 2002

Related U.S. Application Data

(63) Continuation of application No. 09/396,842, filed on Sep. 15, 1999, now abandoned.
(60) Provisional application No. 60/101,397, filed on Sep. 22, 1998.

(51) Int. Cl.[7] .............................. C01B 39/02; B01J 29/06

(52) U.S. Cl. ..................... 423/709; 423/712; 423/716; 423/DIG. 22; 423/717; 501/64; 501/67; 501/71; 501/77; 501/86

(58) Field of Search ................................ 423/700, 709, 423/712, 716, 717, DIG. 22; 502/63, 64, 67, 71, 77, 86

(56) References Cited

U.S. PATENT DOCUMENTS

| | | | | |
|---|---|---|---|---|
| 3,356,450 A | * | 12/1967 | Heinze | |
| 3,702,886 A | * | 11/1972 | Argauer et al. | |
| 4,626,609 A | * | 12/1986 | Shihabi | 585/467 |
| 4,847,224 A | * | 7/1989 | Fajula et al. | 502/67 |
| 4,977,120 A | * | 12/1990 | Sakurada et al. | 502/64 |
| 5,132,260 A | * | 7/1992 | Plee | 502/64 |
| 5,672,331 A | * | 9/1997 | Verduijn | 423/702 |
| 6,111,157 A | * | 8/2000 | Hendriksen et al. | 585/467 |
| 6,150,293 A | * | 11/2000 | Verduijn et al. | 502/67 |

FOREIGN PATENT DOCUMENTS

| | | | |
|---|---|---|---|
| CN | 11059/35 A | * | 8/1995 |
| EP | 110650 A | * | 6/1984 |
| EP | 201264 A | * | 12/1986 |
| EP | 284206 A | * | 9/1988 |
| WO | WO 92/12928 A | * | 8/1992 |
| WO | WO 96/10004 A | * | 4/1996 |
| WO | WO 96/16004 A | * | 5/1996 |
| WO | WO 97/45384 A | * | 12/1997 |
| WO | WO 99/28032 A | * | 6/1999 |

* cited by examiner

Primary Examiner—David Sample

(57) ABSTRACT

This invention relates to a process for producing zeolite-bound high silica zeolites and the use of the zeolite-bound high silica zeolite produced by the process for hydrocarbon conversion. The process is carried out by forming an extrudable paste comprising a mixture of high silica zeolite in the hydrogen form, water, silica, and optionally an extrusion aid, extruding the extrudable paste to form silica-bound high silica zeolite extrudates, and then converting the silica of the binder to a zeolite binder. The zeolite-bound high silica zeolite produced by the process comprises high silica zeolite crystals that are bound together by zeolite binder crystals. The zeolite-bound high silica zeolite finds particular application in hydrocarbon conversion processes, e.g., catalytic cracking, alkylation, disproportionation of toluene, isomerization, and transalkylation reactions.

29 Claims, No Drawings

PREPARATION OF HIGH SILICA ZEOLITES BOUND BY ZEOLITE AND USE THEREOF

This application is a continuation of U.S. application Ser. No. 09/396,842, filed Sep. 15, 1999, now abandoned, which claims the benefit of U.S. Provisional Application Ser. No. 60/101,397, filed Sep. 22, 1998.

FIELD OF THE INVENTION

The present invention relates to a process for preparing high silica zeolites that are bound by zeolite and the use of the zeolite-bound high silica zeolites as prepared by the process as a catalyst in hydrocarbon conversion.

BACKGROUND OF THE INVENTION

Crystalline microporous molecular sieves, both natural and synthetic, have been demonstrated to have catalytic properties for various types of hydrocarbon conversion processes. In addition, the crystalline microporous molecular sieves have been used as adsorbents and catalyst carriers for various types of hydrocarbon conversion processes, and other applications. These molecular sieves are ordered, porous, crystalline material having a definite crystalline structure as determined by x-ray diffraction, within which there are a large number of smaller cavities which may be interconnected by a number of still smaller channels or pores. The dimensions of these channels or pores are such as to allow for adsorption of molecules with certain dimensions while rejecting those of large dimensions. The interstitial spaces or channels formed by the crystalline network enable molecular sieves such as crystalline silicates, crystalline aluminosilicates crystalline silicoalumino phosphates, and crystalline aluminophosphates, to be used as molecular sieves in separation processes and catalysts and catalyst supports in a wide variety of hydrocarbon conversion processes.

Zeolites are comprised of a lattice of silica and optionally alumina combined with exchangeable cations such as alkali or alkaline earth metal ions. Although the term "zeolites" includes materials containing silica and optionally alumina, it is recognized that the silica and alumina portions may be replaced in whole or in part with other oxides. For example, germanium oxide, tin oxide, phosphorous oxide, and mixtures thereof can replace the silica portion. Boron oxide, iron oxide, gallium oxide, indium oxide, and mixtures thereof can replace the alumina portion. Accordingly, the terms "zeolite", "zeolites" and "zeolite material", as used herein, shall mean not only materials containing silicon and, optionally, aluminum atoms in the crystalline lattice structure thereof, but also materials which contain suitable replacement atoms for such aluminum, such as gallosilicates. The term "aluminosilicate zeolite", as used herein, shall mean zeolite materials consisting essentially of silicon and aluminum atoms in the crystalline lattice structure thereof.

High silica zeolites, i.e., zeolites with a high molar silica content, are desirable because of their particular catalytic selectivity and their thermal stability. Thermal stability is particularly important if the zeolite when used as a catalyst or in adsorption procedures is exposed to high temperatures. High silica zeolites are intrinsically hydrophobic and remain stable at temperatures in excess of 500° C.

The silica to trivalent metal oxide, e.g., alumina, gallia, and the like, mole ratio of a given zeolite is often variable. For example, zeolite X can be synthesized with a silica to alumina mole ratio of from 2 to 3; zeolite Y can be synthesized with a silica to alumina mole ratio from 3 to about 7, and zeolite L can be synthesized with a silica to alumina mole ratio from 4 to about 7. In some zeolites, the upper limit of the silica to trivalent metal oxide mole ratio is virtually unlimited. These zeolites are known in the art and include for example, frame work structure types such as MFI, e.g., ZSM-5, MEL, e.g., ZSM-11, MTW, e.g., ZSM-12, and TON, e.g., ZSM-22.

Synthetic zeolites are normally prepared by crystallization of zeolites from a supersaturated synthesis mixture. The resulting crystalline product is then dried and calcined to produce a zeolite powder. Although the zeolite powder has good adsorptive properties, its practical applications are severely limited because it is difficult to operate fixed beds with zeolite powder. Therefore, prior to using the powder in commercial processes, the zeolite crystals are usually bound.

The zeolite powder is typically bound by forming a zeolite aggregate such as a pill, sphere, or extrudate. The extrudate is usually formed by extruding the zeolite in the presence of a non-zeolitic binder and drying and calcining the resulting extrudate. The binder materials used are resistant to the temperatures and other conditions, e.g., mechanical attrition, which occur in various hydrocarbon conversion processes. Examples of binder materials include amorphous materials such as alumina, silica, titania, and various types of clays. It is generally necessary that the zeolite be resistant to mechanical attrition, that is, the formation of fines, which are small particles, e.g., particles having a size of less than 20 microns.

Although such bound zeolite aggregates have much better mechanical strength than the zeolite powder, when such a bound zeolite is used for hydrocarbon conversion, the performance of the zeolite catalyst, e.g., activity, selectivity, activity maintenance, or combinations thereof, can be reduced because of the binder. For instance, since the binder is typically present in an amount of up to about 50 wt. % of zeolite, the binder dilutes the adsorption properties of the zeolite aggregate. In addition, since the bound zeolite is prepared by extruding or otherwise forming the zeolite with the binder and subsequently drying and calcining the extrudate, the amorphous binder can penetrate the pores of the zeolite or otherwise block access to the pores of the zeolite, or slow the rate of mass transfer to the pores of the zeolite which can reduce the effectiveness of the zeolite when used in hydrocarbon conversion. Furthermore, when the bound zeolite is used in hydrocarbon conversion, the binder may affect the chemical reactions that are taking place within the zeolite and also may itself catalyze undesirable reactions, which can result in the formation of undesirable products.

One procedure for making zeolite-bound zeolite involves converting the silica present in the silica binder of a silica-bound zeolite aggregate to a zeolite binder. The silica-bound zeolite aggregates can be made by extruding a paste containing silica and zeolite. This method comprises mixing a mixture of silica and zeolite with water and optionally an extrusion aid followed by mulling and extruding the paste to form a silica-bound zeolite extrudate, and subsequently drying and calcining the extrudate. When such an extrusion procedure is used to prepare silica-bound high silica zeolite extrudates, the extrusion paste usually does not have sufficient plasticity for extrusion of the paste in conventional extruding equipment. Thus, to prepare silica-bound zeolite aggregates suitable for conversion to zeolite bound high silica zeolite, other techniques must be used such as by mixing the silica and zeolite and squeezing the mixture together to form a shaped structure having minimal physical integrity. Such techniques are commercially inefficient and even if used, can result in silica-bound aggregates with less than desirable physical strength and/or physical integrity.

The present invention provides a process for preparing zeolite-bound high silica zeolites useful for hydrocarbon conversion that overcomes or at least mitigates the above-described problems.

SUMMARY OF THE INVENTION

In accordance with the present invention, there is provided a process for preparing high silica zeolites useful for hydrocarbon conversion that are bound by zeolite. The process of the present invention is carried out by forming by extrusion of a silica-bound aggregate containing high silica zeolite in the hydrogen form and then converting the silica to a zeolite binder such as by aging the silica-bound extrudate in an aqueous ionic solution containing a source of hydroxyl ions in an amount sufficient to convert the silica to the zeolite binder.

In another embodiment, the present invention provides a hydrocarbon conversion process for converting organic compounds by contacting the organic compounds under hydrocarbon conversion conditions with the high silica-containing zeolite bound by zeolite as synthesized by the process. Examples of such processes include acid catalyzed reactions such as catalytic cracking, alkylation, dealkylation, disproportionation, and transalkylation reactions and other hydrocarbon conversion processes where cracking is not desired which include catalyzed reactions, such as, dehydrogenation, hydrocracking, isomerization, dewaxing, oligomerization, and reforming.

DETAILED DESCRIPTION OF THE INVENTION

The process of preparing the zeolite-bound high silica zeolites preferably comprises the following steps:

(a) forming an extrudable mass comprising high silica zeolite crystals in the hydrogen form, silica, water, optionally zeolite seeds, and optionally an extrusion aid;

(b) extruding the extrudable mass to form a silica-bound zeolite aggregate; and (c) aging the silica-bound zeolite aggregate at an elevated temperature in an aqueous ionic solution containing sufficient hydroxy ions to cause the silica binder to be converted to the zeolite binder crystals, e.g., an initial molar ratio of $(OH^-):(SiO_2)$ up to 1.2.

The zeolite-bound high silica zeolite produced by the process of the present invention will comprise high silica zeolite crystals that are bound together by zeolite binder crystals. The zeolite-bound high silica zeolite generally will not contain significant amounts of non-zeolitic binder.

The expression "high silica zeolite", as used herein, means a crystalline zeolite structure which has a tetravalent metal oxide, e.g., silica, to trivalent metal oxide, e.g., alumina and gallia, mole ratio greater than 80, e.g., mole ratios from about 100 to about 300, including zeolite structures where the tetravalent metal oxide to trivalent metal oxide ratio is up to about 400 or greater.

The expression "hydrogen form", as used herein, means that at least 70 mole percent, and preferably at least 90 mole percent, of the exchangeable alkali ions of the high silica zeolite are replaced by hydrogen ions. The hydrogen forms of these zeolites [high silica H-zeolites], which are usually produced synthetically in an alkali form and which occur naturally in alkali form, are produced by means of contacting the zeolites with a hydrogen ion containing solution or a hydrogen ion yielding material such as an ammonium ion. That is, an ammonium ion compound can be exchanged for the alkali in the zeolite material and subsequently, when the zeolite material is heated, the ammonium ion compound decomposes and converts the zeolites to their hydrogen form. The various methods for converting zeolite to the hydrogen form are well known. High silica zeolite for use in the present process can be converted to the hydrogen form using any of these known processes.

High silica zeolites used in the process of the present invention include zeolites having a tetravalent metal oxide to trivalent metal oxide mole ratio of greater than 80. Examples of framework structure types which can be synthesized with these mole ratios include large pore zeolites having a *BEA structure type. Large pore zeolites have a pore size greater than about 7 Å. Examples of other zeolites include intermediate pore size zeolites. Intermediate pore size zeolites have a pore size from about 5 to about 7 Å. Of the high silica zeolites, framework structure types such as MFI, MEL, MEI, MTW, EUO, MTT, and TON structure type zeolites are particularly noted. These zeolites and their isotopic framework structures are described in "Atlas of Zeolite Structure Types", eds. W. H. Meier, D. H. Olson and Ch. Baerlocher, Elsevier, Fourth Edition, 1996, which is hereby incorporated by reference. Examples of specific intermediate pore size high silica zeolites include, for example, ZSM-5, ZSM-11, ZSM-12, ZSM-18, ZSM-22, ZSM-23, ZSM-35, ZSM-38, ZSM 48, and ZSM-50.

The high silica zeolites will generally be a composition having the following molar relationship:

$$X_2O_3:(n)YO_2,$$

wherein X is a trivalent element, such as titanium, aluminum, iron, boron, and/or gallium and Y is a tetravalent element such as silicon, tin, and/or germanium; and n has a value greater than 80, e.g., 100.

When the high silica zeolite is an intermediate pore size zeolite, the zeolite will generally have a silica to trivalent metal oxide, e.g. alumina, mole ratio from greater than 80:1 to about 700:1 and usually from about 100:1 to about 500:1.

When the high silica zeolites are an intermediate pore size gallosilicate zeolite, the zeolite will generally be a composition having the following molar relationship:

$$Ga_2O_3:ySiO_2$$

wherein y will have a value greater than 80 and usually from about 100 to about 500. The zeolite framework may contain only gallium and silicon atoms or may also contain a combination of gallium, aluminum, and silicon.

The term "average particle size" as used herein, means the arithmetic average of the diameter distribution of the crystals on a volume basis.

The average particle size of the crystals of the high silica zeolite is preferably from about 0.1 to about 15 microns ($\mu$m). For some applications, the average particle size will preferably be at least about 1 to about 6 microns ($\mu$m). For other applications such as the cracking of hydrocarbons, the preferred average particle size is smaller, e.g., from about 0.1 to about 3.0 microns ($\mu$m).

When the high silica zeolites is intermediate pore size gallosilicate zeolite, e.g., a MFI structure type gallosilicate zeolite, the binder zeolite will usually be an intermediate pore size zeolite having a silica to gallia mole ratio greater than 100. The zeolite of the binder crystals can also have higher silica to gallia mole ratios, e.g., greater than 200, 500, 1000, etc.

The zeolite of the binder can have a structure type that is the same or is different from the structure type of the high silica zeolite. The structure type of the second zeolite will depend on the intended use of the zeolite-bound high silica zeolite.

When the zeolite of the binder crystals is aluminosilicate zeolite, the silica to alumina mole ratio of the zeolite will usually depend upon the structure type of the zeolite and particular hydrocarbon process in which the zeolite-bound high silica zeolite is utilized and is therefore not limited to any particular ratio. In applications where the aluminosilicate zeolite is an intermediate pore size zeolite and low acidity is desired, the binder zeolite will usually have a silica to alumina mole ratio greater than the silica to alumina mole ratio of the zeolite of the high silica zeolite crystals. The binder zeolite can have high silica to alumina mole ratios, e.g., 200:1, 300:1, 500:1, 1,000:1, etc. In certain applications, the zeolite binder may be a Silicalite 1 i.e., the binder zeolite is a MFI structure type substantially free of alumina or Silicalite 2, i.e., the binder zeolite is a MEL structure type substantially free of alumina.

The zeolite binder crystals will usually have a smaller size than the crystals of the high silica zeolite and will preferably have an average particle size of less than 1 micron ($\mu$m), for example, from about 0.1 to about 0.5 micron ($\mu$m). The zeolite binder crystals bind the high silica zeolite crystals and preferably intergrow and form an over-growth which coats or partially coats the high silica zeolite. Preferably, the coating is resistant to attrition.

The zeolite binder is usually present in the zeolite-bound high silica zeolite in an amount in the range of from about 10 to about 60% by weight based on the weight of the zeolite-bound high silica zeolite and, more preferably from about 20 to about 50% by weight.

The high silica zeolite may be prepared in the usual way i.e., a zeolite synthesis mixture is prepared and aged to allow crystallization. The resulting product is then washed, dried, calcined, and converted to the hydrogen form. Next, the high silica H-zeolite is mixed with silica, water, and optionally an extrusion aid, formed into an extrudable paste, and extruded to form an extrudate. Typical extruders include extrusion presses, which are also termed ram extruders, and screw extruders. In an extrusion press or ram extruder, a mass of material is forced through a die by means of a plunger or piston which may be mechanically or hydraulically operated. In a screw extruder, the material is transported from a feed point to the die by means of a turning screw or auger. After formation, drying and calcining of the extrudates, the silica binder of the extrudate is then converted to the zeolite binder.

To convert the silica binder to the zeolite binder, the zeolite extrudate is usually aged, i.e. converted, at elevated temperature. A suitable aging temperature may range from 95° to 200° C. depending on the type of zeolite. Zeolites such as MFI-type zeolites may be aged at temperatures such as 130° to 170°, preferably 145° to 155° C., most preferably around 150°.

The time during which the extrudate may be aged will depend on the zeolite being aged, but may be for example, from 20 to 140 hours.

The zeolite-bound high silica zeolite is preferably prepared by a three step procedure. The first step involves the preparation of the high silica H-zeolite crystals. Processes for preparing the high silica zeolite crystals are known to persons skilled in the art. For example, the preparation of high silica ZSM-5 is disclosed in U.S. Pat. No. 3,702,886. After preparation of the crystals, the high silica zeolite can be calcined and then converted to the hydrogen form such as by ion exchange of the alkali form with intermediate ammonium cation followed by calcination to remove ammonia and form high silica H-zeolite.

In the second step, a silica-bound zeolite aggregate is prepared by forming a mixture comprising the high silica H-zeolite crystals, a silica gel or sol, water, optionally seeds, and optionally an extrusion aid, until a homogeneous composition in the form of an extrudable paste develops. The silica binder used in preparing the silica-bound zeolite aggregate is preferably a mixture of a colloidal silica in combination with a pyrogenic silica or the like and optionally can contain various amounts of trivalent elements, e.g., aluminum, gallium, boron, iron, zinc, or mixtures thereof. The amount of silica used is such that the content of the zeolite in the dried extrudate at this stage will range from about 40 to 90% by weight more preferably from about 50 to about 80% by weight, with the balance being primarily silica, e.g. about 20 to 50% by weight silica.

The resulting paste is then extruded in an extruder, and then cut into small strands, e.g., approximately 2 mm diameter extrudates. The extrudates are dried at 100° C. to 150° C. for a period of 4–12 hours and then are calcined in air at a temperature of from about 400° C. to 550° C. for a period of from about 1 to 10 hours.

The final step of the three step process is the conversion of the silica present in the silica-bound high silica zeolite to binder crystals of zeolite which bind the high silica zeolite crystals together. The high silica zeolite crystals are held together without the use of a significant amount of non-zeolite binder. Preferably, the zeolite-bound high silica zeolite contains less than 10 percent by weight, based on the weight of the high silica zeolite and binder zeolite, of non-zeolitic binder, more preferably, contains less than 5 percent by weight, and, most preferably, the catalysts is substantially free of non-zeolitic binder.

To prepare the zeolite-bound high silica zeolite, the silica-bound aggregate which can also contain zeolite seed crystals is preferably first aged in an appropriate aqueous solution at elevated temperature. The use of zeolite colloidal seeds is disclosed in provisional U.S. application Ser. No. 06/067, 417, filed Dec. 3, 1997, now U.S. application Ser. No. 09/204,736, filed Dec. 3, 1998, and entitled "Preparation of Zeolite Bound Zeolite", which is hereby incorporated by reference. Next, the contents of the solution and the temperature at which the aggregate is aged are selected to convert the amorphous silica binder into the zeolite binder. The newly-formed zeolite is produced as crystals. The crystals may grow on and/or adhere to the high silica zeolite crystals, and may also be produced in the form of new intergrown crystals, which are generally much smaller than the initial crystals, e.g., of sub-micron size. These newly formed crystals may grow together and interconnect.

The nature of the zeolite formed in the secondary synthesis conversion of the silica to zeolite may vary as a function of the composition of the secondary synthesis solution and synthesis aging conditions. The secondary synthesis solution is preferably an aqueous ionic solution containing a source of hydroxy ions, optionally an organic structure directing agent, and optionally various amounts of trivalent elements, e.g., aluminum, gallium, boron, iron, zinc, or mixtures thereof, sufficient to convert the silica to the desired zeolite. It is important, however, that the aging solution have a pH which is not too alkaline, e.g., an initial molar ratio of $OH^-:SiO_2$ of 0.05 to 0.12. If the pH is too high the silica present in the silica-bound zeolite extrudate may tend to dissolve out of the extrudate.

The zeolite-bound high silica zeolite may be further ion exchanged as is known in the art either to replace at least in part the metals present in the zeolite with a different cation, e.g. a metal from Group IB to VIII of the Periodic Table or to provide a more acidic form of the zeolite. Particularly preferred cations are those which render the material catalytically active, especially for certain hydrocarbon conversion reactions. These include hydrogen, rare earth metals, and one or more metals of Groups IIA, IIIA, IVA, VA, VIA, VIIA, VIII, IB, IIB, IIIB, IVB, and VB of the Periodic Table of the Elements. Examples of suitable metals include Group VIII metals (i.e., Pt. Pd, Ir, Rh, Os, Ru, Ni, Co and Fe), Group IVA metals (i.e., Sn and Pb), Group VB metals (i.e., Sb and Bi), and Group VIIB metals (i.e., Mn, Tc and Re). Noble metals (i.e., Pt, Pd, Ir, Rh, Os and Ru) are sometimes preferred.

The zeolite-bound high silica zeolite of the present invention can be used in processing hydrocarbon feedstocks. Hydrocarbon feed-stocks contain carbon compounds and can be from many different sources, such as virgin petroleum fractions, recycle petroleum fractions, tar sand oil, and, in general, can be any carbon containing fluid susceptible to zeolitic catalytic reactions. Depending on the type of processing the hydrocarbon feed is to undergo, the feed can contain metal or can be free of metals. Also, the feed can also have high or low nitrogen or sulfur impurities.

The conversion of hydrocarbon feeds can take place in any convenient mode, for example, in fluidized bed, moving bed, or fixed bed reactors depending on the types of process desired.

The zeolite-bound high silica zeolite by itself or in combination with one or more catalytically active substances can be used as a catalyst or support for a variety of organic, e.g., hydrocarbon compound, conversion processes. Examples of such conversion processes include, as non-limiting examples, the following:

(A) The catalytic cracking of a naphtha feed to produce light olefins. Typical reaction conditions include from about 500° C. to about 750° C., pressures of subatmospheric or atmospheric, generally ranging up to about 10 atmospheres (gauge) and residence time (volume of the catalyst, feed rate) from about 10 milliseconds to about 10 seconds.

(B) The catalytic cracking of high molecular weight hydrocarbons to lower weight hydrocarbons. Typical reaction conditions for catalytic cracking include temperatures of from about 400° C. to about 700° C., pressures of from about 0.1 atmosphere (bar) to about 30 atmospheres, and weight hourly space velocities of from about 0.1 to about 100 $hr^{-1}$.

(C) The transalkylation of aromatic hydrocarbons in the presence of polyalkylaromatic hydrocarbons. Typical reaction conditions include a temperature of from about 200° C. to about 500° C., a pressure of from about atmospheric to about 200 atmospheres, a weight hourly space velocity of from about 1 to about 100 $hr^{-1}$ and an aromatic hydrocarbon/polyalkylaromatic hydrocarbon mole ratio of from about 1/1 to about 16/1.

(D) The isomerization of aromatic (e.g., xylene) feedstock components. Typical reaction conditions for such include a temperature of from about 230° C. to about 510° C., a pressure of from about 0.5 atmospheres to about 50 atmospheres, a weight hourly space velocity of from about 0.1 to about 200 and a hydrogen/hydrocarbon mole ratio of from about 0 to about 100.

(E) The dewaxing of hydrocarbons by selectively removing straight chain paraffins. The reaction conditions are dependent in large measure on the feed used and upon the desired pour point. Typical reaction conditions include a temperature between about 200° C. and 450° C., a pressure up to 3,000 psig and a liquid hourly space velocity from 0.1 to 20.

(F) The alkylation of aromatic hydrocarbons, e.g., benzene and alkylbenzenes, in the presence of an alkylating agent, e.g., olefins, formaldehyde, alkyl halides and alcohols having 1 to about 20 carbon atoms. Typical reaction conditions include a temperature of from about 100° C. to about 500° C., a pressure of from about atmospheric to about 200 atmospheres, a weight hourly space velocity of from about 1 $hr^{-1}$ to about 100 $hr^{-1}$ and an aromatic hydrocarbon/alkylating agent mole ratio of from about 1/1 to about 20/1.

(G) The alkylation of aromatic hydrocarbons, e.g., benzene, with long chain olefins, e.g., $C_{14}$ olefin. Typical reaction conditions include a temperature of from about 50° C. to about 200° C., a pressure of from about atmospheric to about 200 atmospheres, a weight hourly space velocity of from about 2 $hr^{-1}$ to about 2000 $hr^{-1}$ and an aromatic hydrocarbon/olefin mole ratio of from about 1/1 to about 20/1. The resulting product from the reaction are long chain alkyl aromatics which when subsequently sulfonated have particular application as synthetic detergents.

(H) The alkylation of aromatic hydrocarbons with light olefins to provide short chain alkyl aromatic compounds, e.g., the alkylation of benzene with propylene to provide cumene. Typical reaction conditions include a temperature of from about 10° C. to about 200° C., a pressure of from about 1 to about 30 atmospheres, and an aromatic hydrocarbon weight hourly space velocity (WHSV) of from 1 $hr^{-1}$ to about 50 $hr^{-1}$.

(I) The hydrocracking of heavy petroleum feedstocks, cyclic stocks, and other hydrocrack charge stocks. The zeolite-bound high silica zeolite will contain an effective amount of at least one hydrogenation component of the type employed in hydrocracking catalysts.

(J) The alkylation of a reformate containing substantial quantities of benzene and toluene with fuel gas containing short chain olefins (e.g., ethylene and propylene) to produce mono- and dialkylates. Preferred reaction conditions include temperatures from about 100° C. to about 250° C., a pressure of from about 100 to about 800 psig, a WHSV-olefin from about 0.4 $hr^{-1}$ to about 0.8 $hr^{-1}$, a WHSV-reformate of from about 1 $hr^{-1}$ to about 2 $hr^{-1}$ and, optionally, a gas recycle from about 1.5 to 2.5 vol/vol fuel gas feed.

(K) The alkylation of aromatic hydrocarbons, e.g., benzene, toluene, xylene, and naphthalene, with long chain olefins, e.g., $C_{14}$ olefin, to produce alkylated aromatic lube base stocks. Typical reaction conditions include temperatures from about 100° C. to about 400° C. and pressures from about 50 to 450 psig.

(L) The alkylation of phenols with olefins or equivalent alcohols to provide long chain alkyl phenols. Typical reaction conditions include temperatures from about 100° C. to about 250° C., pressures from about 1 to 300 psig and total WHSV of from about 2 $hr^{-1}$ to about 10 $hr^{-1}$.

(M) The conversion of light paraffins to olefins and/or aromatics. Typical reaction conditions include temperatures from about 425° C. to about 760° C. and pressures from about 10 to about 2000 psig.

(N) The conversion of light olefins to gasoline, distillate and lube range hydrocarbons. Typical reaction conditions include temperatures of from about 175° C. to about 375° C. and a pressure of from about 100 to about 2000 psig.

(O) Two-stage hydrocracking for upgrading hydrocarbon streams having initial boiling points above about 200° C. to premium distillate and gasoline boiling range products or as feed to further fuels or chemicals processing steps. The first stage can be the zeolite-bound high silica zeolite comprising one or more catalytically active substances, e.g., a Group VIII metal, and the effluent from the first stage would be reacted in a second stage using a second zeolite, e.g., zeolite Beta, comprising one or more catalytically active substances, e.g., a Group VIII metal, as the catalyst. Typical reaction conditions include temperatures from about 315° C. to about 455° C., a pressure from about 400 to about 2500 psig, hydrogen circulation of from about 1000 to about 10,000 SCF/bbl and a liquid hourly space velocity (LHSV) of from about 0.1 to 10.

(P) A combination hydrocracking/dewaxing process in the presence of the zeolite-bound high silica zeolite comprising a hydrogenation component and a zeolite such as zeolite Beta. Typical reaction conditions include temperatures from about 350° C. to about 400° C., pressures from about 1400 to about 1500 psig, LHSVs from about 0.4 to about 0.6 and a hydrogen circulation from about 3000 to about 5000 SCF/bbl.

(Q) The reaction of alcohols with olefins to provide mixed ethers, e.g., the reaction of methanol with isobutene and/or isopentene to provide methyl-t-butyl ether (MTBE) and/or t-amyl methyl ether (TAME). Typical conversion conditions include temperatures from about 20° C. to about 200° C., pressures from 2 to about 200 atm, WHSV (gram-olefin per hour gram-zeolite) from about 0.1 $hr^{-1}$ to about 200 $hr^{-1}$ and an alcohol to olefin molar feed ratio from about 0.1/1 to about 5/1.

(R) The disproportionation of aromatics, e.g. the disproportionation toluene to make benzene and paraxylene. Typical reaction conditions include a temperature of from about 200° C. to about 760° C., a pressure of from about atmospheric to about 60 atmosphere (bar), and a WHSV of from about 0.1 $hr^{-1}$ to about 30 $hr^{-1}$.

(S) The conversion of naphtha (e.g., $C_6$–$C_{10}$) and similar mixtures to highly aromatic mixtures. Thus, normal and slightly branched chained hydrocarbons, preferably having a boiling range above about 40° C., and less than about 200° C., can be converted to products having a substantial higher octane aromatics content by contacting the hydrocarbon feed with the zeolite at a temperature in the range of from about 400° C. to 600° C., preferably 480° C. to 550° C. at pressures ranging from atmospheric to 40 bar, and liquid hourly space velocities (LHSV) ranging from 0.1 to 15.

(T) The adsorption of alkyl aromatic compounds for the purpose of separating various isomers of the compounds.

(U) The conversion of oxygenates, e.g., alcohols, such as methanol, or ethers, such as dimethylether, or mixtures thereof to hydrocarbons including olefins and aromatics with reaction conditions including a temperature of from about 275° C. to about 600° C., a pressure of from about 0.5 atmosphere to about 50 atmospheres and a liquid hourly space velocity of from about 0.1 to about 100.

(V) The oligomerization of straight and branched chain olefins having from about 2 to about 5 carbon atoms. The oligomers which are the products of the process are medium to heavy olefins which are useful for both fuels, i.e., gasoline or a gasoline blending stock, and chemicals. The oligomerization process is generally carried out by contacting the olefin feedstock in a gaseous state phase with a zeolite-bound high silica zeolite at a temperature in the range of from about 250° C. to about 800° C., a LHSV of from about 0.2 to about 50 and a hydrocarbon partial pressure of from about 0.1 to about 50 atmospheres. Temperatures below about 250° C. may be used to oligomerize the feedstock when the feedstock is in the liquid phase when contacting the zeolite-bound high silica zeolite catalyst. Thus, when the olefin feedstock contacts the catalyst in the liquid phase, temperatures of from about 10° C. to about 250° C. may be used.

(W) The conversion of $C_2$ unsaturated hydrocarbons (ethylene and/or acetylene) to aliphatic $C_{6-12}$ aldehydes and converting said aldehydes to the corresponding $C_{6-12}$ alcohols, acids, or esters.

In general, the, catalytic conversion conditions over the zeolite-bound high silica zeolite catalyst include a temperature of from about 100° C. to about 760° C., a pressure of from about 0.1 atmosphere (bar) to about 200 atmospheres (bar), a weight hourly space velocity of from about 0.08 $hr^{-1}$ to about 2,000 $hr^{-1}$.

Although many hydrocarbon conversion processes prefer that the binder crystals have lower acidity to reduce undesirable reactions external to the high silica zeolite crystals, some processes prefer that the binder crystals have higher acidity, e.g., cracking reactions.

The zeolite-bound high silica zeolite can have particular application in the vapor phase disproportionation of toluene. Such vapor phase disproportionation comprises contacting toluene under disproportionation conditions with zeolite-bound high silica zeolite to yield a product mixture which comprises a mixture of unreacted (unconverted) toluene, benzene and xylene. In the more preferred embodiment, the catalyst is first selectivated prior to use in the disproportionation process to enhance conversion of toluene to xylene and to maximize the catalyst selectivity towards the production of paraxylene. Processes for selectivating the catalyst are known to persons skilled in the art. For instance, selectivation may be accomplished by exposing the catalyst in a reactor bed to a thermally decomposable organic compound, e.g. toluene, at a temperature in excess of the decomposition temperature of said compound, e.g. from about 480° C. to about 650° C., more preferably 540° C. to about 650° C., at a WHSV in the range of from about 0.1 to 20 lbs of feed per pound of catalyst per hour, at a pressure in the range of from about 1 to 100 atmospheres, and in the presence of 0 to about 2 moles of hydrogen, more preferably from about 0.1 to about 2 moles of hydrogen per mole of organic compound, and optionally in the presence of 0–10 moles of nitrogen or another inert gas per mole of organic compound. This process is conducted for a period of time until a sufficient quantity of coke has been deposited on the catalyst surface, generally at least about 2% by weight and more preferably from about 8 to about 40% by weight of coke. In a preferred embodiment, such a selectivation process is conducted in the presence of hydrogen in order to prevent rampant formation of coke on the catalyst.

Selectivation of the catalyst can also be accomplished by treating the catalyst with a selectivation agent such as an organosilicon compound. Examples of organosilicon compounds include polysiloxane including silicones, a siloxane, and a silane including disilanes and alkoxysilanes.

Silicone compounds that find particular application can be represented by the formula:

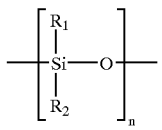

wherein $R_1$ is hydrogen, fluoride, hydroxy, alkyl, aralkyl, alkaryl or fluoro-alkyl. The hydrocarbon substituents generally contain from 1 to 10 carbon atoms and preferably are methyl or ethyl groups. $R_2$ is selected from the same group as $R_1$, and n is an integer of at least 2 and generally in the range of 2 to 1000. The molecular weight of the silicone compound employed is generally between 80 and 20,000 and preferably 150 to 10,000. Representative silicone compounds included dimethylsilicone, diethylsilicone, phenylmethylsilicone, methyl hydrogensilicone, ethylhydrogensilicone, phenylhydrogensilicone, methylethylsilicone, phenylethylsilicone, diphenylsilicone, methyltri fluoropropylsilicone, ethyltrifluoropropylsilicone, tetrachlorophenyl methyl silicone, tetrachlorophenylethyl silicone, tetrachloro phenylhydrogen silicone, tetrachlorophenylphenyl silicone, methylvinylsilicone and ethylvinylsilicone. The silicone compound need not be linear but may be cyclic as for example hexamethylcyclotrisiloxane, octamethylcyclotetrasiloxane, hexaphenyl cyclotrisiloxane and octaphenylcyclotetrasiloxane. Mixtures of these compounds may also be used as well as silicones with other functional groups.

Useful siloxanes or polysiloxanes include as non-limiting examples hexamethylcyclotrisiloxane, octamethylcyclotetrasiloxane, decamethyl cyclopentasiloxane, hexamethyldisiloxane, octamethytrisiloxane, decamethyltetrasiloxane, hexaethylcyclotrisiloxane, octaethylcyclo tetrasiloxane, hexaphenylcyclotrisiloxane and octaphenylcyclo tetrasiloxane.

Useful silanes, disilanes, or alkoxysilanes include organic substituted silanes having the general formula:

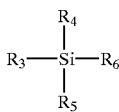

wherein $R_3$ is a reactive group such as hydrogen, alkoxy, halogen, carboxy, amino, acetamide, trialkylsilyoxy, $R_4$, $R_5$ and $R_6$ can be the same as $R_3$ or can be an organic radical which may include alkyl of from 1 to 40 carbon atoms, alkyl or aryl carboxylic acid wherein the organic portion of the alkyl contains 1 to 30 carbon atoms and the aryl group contains 6 to 24 carbon which may be further substituted, alkylaryl and arylalkyl groups containing 7 to 30 carbon atoms. Preferably, the alkyl group for an alkyl silane is between 1 and 4 carbon atoms in chain length.

When used the vapor phase disproportionation of toluene, the catalyst can comprise a first phase of crystals of MFI-type high silica zeolite crystals having a micron average particle size from about 2 to about 6, a silica to alumina mole ratio of from greater than 80 to about 200:1, preferably, greater than 80:1 to about 120:1, having adhered structurally to the surfaces thereof particles of zeolite binder, e.g., MEL or MFI structure type having an average particle size of less than about one micron ($\mu$m) and having a alumina to silica mole ratio in excess of about 200:1 to about 10,000:1 including Silicalite 1 or Silicalite 2.

Once the catalyst has been selectivated to the desired degree, reactor selectivation conditions are changed to disproportionation conditions. Disproportionation conditions include a temperature between about 400° C. and about 550° C., more preferably between about 425° C. and about 510° C., at a hydrogen to toluene mole ratio of from 0 to about 10, preferably between about 0.1 and 5 and more preferably from about 0.1 to 1, at a pressure between about 1 atmosphere and 100 atmospheres and utilizing WHSV of between about 0.5 and 50.

The disproportionation process may be conducted as a batch, semi-continuous or continuous operation using a fixed or moving bed catalyst system deposited in a reactor bed. The catalyst may be regenerated after coke deactivation by burning off the coke to a desired extent in an oxygen-containing atmosphere at elevated temperatures as know in the art.

The zeolite-bound high silica zeolite finds particular application as a catalyst in a process for isomerizing one or more xylene isomers in a $C_8$ aromatic feed to obtain ortho-, meta-, and para-xylene in a ratio approaching the equilibrium value. In particular, xylene isomerization is used in conjunction with a separation process to manufacture paraxylene. For example, a portion of the para-xylene in a mixed $C_8$ aromatics stream may be recovered using processes known in the art, e.g., crystallization, adsorption, etc. The resulting stream is then reacted under xylene isomerization conditions to restore ortho-, meta-, and paraxylenes to a near equilibrium ratio. Ethylbenzene in the feed is either removed from the stream or is converted during the process to xylenes or to benzene which are easily separated by distillation. The isomerate is blended with fresh feed and the combined stream is distilled to remove heavy and light by-products. The resultant $C_8$ aromatics stream is then recycled to repeat the cycle.

It is important that xylene isomerization catalysts produce a near equilibrium mixture of xylenes and it is also usually desirable that the catalyst convert ethylbenzene with very little net loss of xylenes. The silica to trivalent metal oxide, e.g., alumina and gallia, mole ratios of the high silica zeolite and zeolite binder can be selected to balance xylene isomerization and ethylbenzene dealkylation while minimizing undesirable side reactions. Accordingly, the zeolite-bound high silica zeolite finds particular application in a hydrocarbon conversion process which comprises contacting a $C_8$ aromatic stream containing one or more xylene isomers or ethylbenzene or a mixture thereof, under isomerization conditions with the zeolite-bound high silica zeolite. Preferably, at least 30% of the ethylbenzene is converted.

In the vapor phase, suitable isomerization conditions include a temperature in the range of from about 250° C. to about 600° C., preferably from about 300° C. to about 550° C., a pressure in the range of from about 0.5 to about 50 atm abs, preferably from about 10 to about 25 atm abs, and a weight hourly space velocity (WHSV) of from about 0.1 to about 100, preferably from about 0.5 to about 50. Optionally, isomerization in the vapor phase is conducted in the presence of from about 3.0 to about 30.0 moles of hydrogen per mole of alkylbenzene. If hydrogen is used, the metal components of the zeolite-bound high silica zeolite preferably includes from about 0.1 to about 2.0 wt. % of a hydrogenation/dehydrogenation component selected from Group VIII of the Periodic Table of Elements, especially platinum, palladium, or nickel. By Group VIII metal component, it is meant the metals and their compounds such as oxides and sulfides.

The zeolite-bound high silica zeolite invention is useful as a catalyst in a process for cracking a naphtha feed, e.g., $C_4^+$ naphtha feed, particularly a $C_4^-$ 290° C. naphtha feed to produce low molecular weight olefins, e.g., $C_2$ through $C_4$ olefins, particularly ethylene and propylene. Such a process is preferably carried out by contacting the naphtha feed at temperatures ranging from about 500° C. to about 750° C., more preferably about 550° C. to about 675° C., at a pressure from subatmospheric up to about 10 atmospheres, but preferably from about 1 atmosphere to about 3 atmospheres.

The zeolite-bound high silica zeolite is useful as a catalyst in the transalkylation of polyalkylaromatic hydrocarbons. Examples of suitable polyalkylaromatic hydrocarbons include di-, tri-, and tetra-alkyl aromatic hydrocarbons, such as diethylbenzene, triethylbenzene, diethylmethylbenzene (diethyl-toluene), diisopropyl-benzene, triisopropylbenzene, diisopropyltoluene, dibutylbenzene, and the like. Preferred polyalkylaromatic hydro-carbons are the dialkyl benzenes. Particularly preferred polyalkyl-aromatic hydrocarbons are diisopropylbenzene and diethylbenzene.

The transalkylation process will preferably have a molar ratio of aromatic hydrocarbon to polyalkylaromatic hydrocarbon of preferably from about 0.5:1 to about 50:1, and more preferably from about 2:1 to about 20:1. The reaction temperature will preferably range from about 340° C. to about 500° C. to maintain at least a partial liquid phase, and the pressure will be preferably in the range of about 50 psig to about 1,000 psig, preferably from about 300 psig to about 600 psig. The weight hourly space velocity will range from about 0.1 to about 10.

The zeolite-bound high silica zeolite is also useful in processes for converting aromatic compounds by the dehydrocyclo-oligomerization of aliphatic hydrocarbons. Example of suitable paraffins including aliphatic hydrocarbons containing 2 to 12 carbon atoms. The hydrocarbons may be straight chain, open or cyclic and may be saturated or unsaturated. Example of hydrocarbons include propane, propylene, n-butane, n-butenes, isobutane, isobutene, and straight- and branch-chain and cyclic pentanes, pentenes, hexanes, and hexenes.

The dehydrocyclo-oligomerization conditions include a temperature of from about 200° C. to about 700° C., a pressure of from about 0.1 atmosphere to about 60 atmospheres, a weight hourly space velocity (WHSV) of from about 0.1 to about 400 and a hydrogen/hydrocarbon mole ratio of from about 0 to about 20.

The zeolite-bound high silica zeolite used in the dehydrocyclo-oligomerization process preferably comprises of an intermediate pore size high silica zeolite such a MFI type zeolite (example ZSM-5), and binder crystals of a intermediate pore size such as a MEL structure type. The catalyst preferably contains gallium. Gallium may be incorporated during the synthesis of the zeolite or it may be exchanged or impregnated or otherwise incorporated into the zeolite after synthesis. Preferably 0.05 to 10, and most preferably 0.1 to 2.0 wt. % gallium is associated with the zeolite-bound high silica zeolite catalyst. The gallium can be associated with the high silica zeolite, binder zeolite, or both zeolites.

The following examples illustrate the invention.

EXAMPLE 1

(Zeolite-Bound MFI Gallosilicate High Silica Zeolite)

A. Preparation of MFI Structure Type Gallosilicate High Silica H-Zeolite.

High silica MFI structure type gallosilicate having a silica to gallia mole ratio of 190 was prepared as follows:

| Components Use for Preparation | Quantity (Grams) |
|---|---|
| Solution A | |
| NaOH pellets (98.6%) | 18.82 |
| Ga$_2$O$_3$ (99.995%) | 4.81 |
| Water (conductivity less than 5 µS/cm) | 50.00 |
| Rinse Water | 185.01 |
| Solution B | |
| Colloidal Silica (Ludox HS-40) | 773.00 |
| Water (conductivity less than 5 µS/cm) | 100.03 |
| Solution C | |
| Tetrapropylammonium bromide | 123.72 |
| Water (conductivity less than 5 µS/cm) | 425.00 |
| Rinse Water | 125.00 |

The ingredients of Solution A were dissolved by boiling until a clear solution was obtained. Solution A was then cooled to ambient temperature and water loss from boiling was corrected.

Solution B was prepared by adding the specified amount of the colloidal silica to a 2 liter glass beaker, adding the specified amounts of water to the contents of the beaker, and then homogenizing the mixture by stirring. Solution C was prepared by adding the specified amounts of TPABr and water to a 1 liter glass beaker and mixing. Solution C was added to Solution B using the rinse water to quantitatively transfer Solution C. The two solutions were mixed for two minutes and then 7.88 grams of colloidal MFI seed suspension containing 0.64 mg. solids/gr. were added. Next, Solution A was added together with its rinse water. The contents were mixed for 10 minutes. A just pourable visually homogeneous gel was obtained. The gel had the following composition expressed in moles of pure oxide:

$$0.45\ Na_2O/0.90\ TPA\ Br/0.05\ Ga_2O_3/10SiO_2/147\ H_2O$$

The synthesis mixture contained 2.8 wt. ppm seeds.

An amount of 1789.47 grams of the synthesis mixture was transferred to a 2 liter stainless steel autoclave. The autoclave was placed in a room temperature oven and heated to 150° C. in 2 hours and maintained at 150° C. at this temperature for 42 hours.

The product was removed from the autoclave, washed with water to a pH of 10.3, and dried over night at 120° C. The amount of product recovered was 328.4 grams. The product was calcined in air at 490° C. for 24 hours with a heat-up rate of 1.5° C./min. The weight loss on calcination was 11.5 wt. %. The characteristics of the calcined product were the following:

| | |
|---|---|
| XRD: | Excellently Crystalline MFI |
| SEM: | Uniformly spherical 2.3 micron size crystals |
| Elemental: | SiO$_2$/Ga$_2$O$_3$ = 190 |

The portion of the calcined product was converted to the hydrogen form by mixing it with 1200 grams of 10% by weight of ammonium nitrate for 16 hours at 69.5° C. The product was washed twice with 900 grams of water and then dried at 120° C. The ammonium exchange, washing and drying procedure were then repeated. Next, the ammonium exchanged product was calcined in air at 490° C. for 20 hours.

B. Preparation of Silica-Bound MFI Gallosilicate High Silica H-Zeolite.

A portion of the calcined product of Step A. was formed into silica-bound extrudates of 2 mm as follows:

| Components Used for Preparation | Quantity (Grams) |
| --- | --- |
| Silica Sol (Nyacol 1034 A) | 128.65 |
| Silica gel (aerosil 300) | 12.25 |
| $H_2PtCl_6 \cdot 6H_2O$ | 2.40 |
| Water (conductivity less than 5 $\mu$S/cm) | 30.04 |
| Rinse Water | 8.00 |
| H-Gallosilicate MFI | 130.00 |
| Extrusion Aid (hydroxypropyl methyl cellulose) | 0.91 |

The components were mixed in a food mixer in the order shown. After adding the extrusion aid and mixing for about 7 minutes, a smooth paste was obtained. The paste was extruded into 2 mm extrudates and dried at ambient temperature for 3 hours. The air dried extrudates were dried in an oven at 120° C. for 16 hours. After drying, the strands were broken in 5 mm pieces. The total weight of the dried extrudate was 144.3 grams. The dried extrudates were then calcined in air at 490° C. for 8 hours.

C. Conversion to Zeolite-Bound MFI Gallosilicate High Silica Zeolite.

The silica-bound extrudates were converted into zeolite-bound high silica zeolite as follows:

| Components Used for Preparation | Quantity (Grams) |
| --- | --- |
| Solution A | |
| NaOH pellets (98.6%) | 1.438 |
| Gallia (99.995%) | 0.177 |
| Water (conductivity less than 5 $\mu$S/cm) | 20.45 |
| Rinse Water | 30.14 |
| Solution B | |
| Tetrapropylammonium bromide (99%) | 9.95 |
| Water (conductivity less than 5 $\mu$S/cm) | 20.20 |
| Rinse Water | 30.23 |

Solutions A and B were poured into a 300 ml stainless steel autoclave and mixed. Next, 75.0 grams of the silica-bound high silica zeolite extrudates of Step B were added to the contents of the autoclave. The molar composition of the synthesis mixture was:

$$0.47Na_2O/0.025Ga_2O_3/10SiO_2/150H_2O$$

The autoclave was placed into an oven. The oven was heated from room temperature to 150° C. in 2 hours and maintained at this temperature for 80 hours. The resulting product was washed to a conductivity of 50 $\mu$S/cm with hot water. The extrudates were dried at 120° C. The weight of the dry product was 78.85 grams. The product was then calcined in air at 490° C. for 16 hours.

The product was analyzed by XRD and SEM with the following results:

| XRD: | Excellent crystallinity |
| --- | --- |
| SEM: | Core crystals coated and glued together by a myriad of nano-sized and submicron sized crystals |
| Elemental: | Core crystals: $SiO_2/Ga_2O_3$ = 190 |
| | Binder crystals: $SiO_2/Ga_2O_3$ = 400 |
| | Platinum = 0.5 wt. % |

EXAMPLE 2

The procedures of steps A and B of Example 1 were repeated to prepare a silica-bound high silica zeolite except aluminosilicate MFI structure type high silica zeolite was prepared following the procedure of Step A and the silica-bound high silica zeolite extrudates were formed using this material and following the procedure of Step B. The resulting silica-bound high silica zeolite extrudates were converted to zeolite-bound high silica zeolite. A synthesis mixture with a molar composition of 0.48 $Na_2/O$/1.01 TPABr/10 $SiO_2$/148 $H_2O$ was prepared using the same procedure as described in Step C of Example 1. In the composition, the silica is present in the extrudates. The mixture was crystallized at 150° C. during 80 hours. The resulting zeolite-bound high silica zeolite were washed, dried and calcined following the procedure described in Step C. SEM showed that the product was comprised of aluminosilicate MFI structure type high silica zeolite crystals which were coated and glued together by submicron sized silicalite crystals.

EXAMPLE 3

To show the importance of extruding an extrusion paste containing high silica H-zeolites rather than zeolites in the alkali form, e.g., sodium form, an extrusion paste was prepared following the same procedures of Steps A and B of Example 1 except that MFI gallosilicate high silica zeolite in the sodium form was used in place of MFI gallosilicate high silica H-zeolite in the mixture that formed the extrusion paste. The paste was not smooth, lacked plasticity, and was not extrudable.

We claim:

1. A process for preparing zeolite-bound high silica zeolite which contains less than 10 percent by weight of non-zeolitic binder and comprises high silica zeolite crystals and zeolite binder crystals, said process comprising:

(a) providing a mixture of high silica zeolite in the hydrogen form, water, and silica to provide an extrudable mass;

(b) extruding said extrudable mass to form a silica-bound high silica zeolite extrudate; and (c) converting the silica of the binder of said extrudate to a zeolite binder.

2. The process recited in claim 1, wherein said silica binder is converted to said zeolite binder by converting at an elevated temperature said silica-bound high silica zeolite extrudate in an aqueous ionic solution which contains hydroxy ions and optionally an organic structure directing agent such that the initial molar ratio of $(OH^-):(SiO_2)$ is in the range of from about 0.05 to about 1.2.

3. The process recited in claim 2, wherein said high silica zeolite has a large pore size or an intermediate pore size.

4. The process recited in claim 3, wherein said high silica zeolite has a structure type selected from the group consisting of *BEA, MFI, MEL, MEI, MTW, MTT, TON, and mixtures thereof.

5. The process recited in claim 4, wherein the zeolite binder has a structure type that is different from the structure type of said high silica zeolite.

6. The process recited in claim 4, wherein the zeolite binder has the same structure type as said high silica zeolite.

7. The process recited in claim 4, wherein the binder zeolite has lower acidity than the zeolite in the extrudate.

8. The process recited in claim 4, wherein the binder zeolite has higher acidity than said high silica zeolite.

9. The process recited in claim 4, wherein said binder zeolite has a silica to alumina mole ratio greater than about 200:1 or a silica to gallia mole ratio greater than about 100:1.

10. The process recited in claim 9, wherein said high silica zeolite has a silica to alumina mole ratio of from greater than 80:1 to about 700:1 or a silica to gallia mole ratio of from greater than 80:1 to about 500:1.

11. The process recited in claim 10, wherein said high silica zeolite and said binder zeolite have a MFI or MEL structure.

12. The process recited in claim 4, wherein said zeolite binder is present in said zeolite-bound high silica zeolite in an amount in the range of from about 20 to about 50 weight percent based on the weight of said high silica zeolite.

13. The process recited in claim 4, wherein said zeolite-bound high silica zeolite contains less than 5 percent by weight of non-zeolitic binder based on the weight of said high silica zeolite and zeolite binder.

14. The process recited in claim 4, wherein said high silica zeolite crystals have an average particle size of from about 1 to about 6 microns.

15. The process recited in claim 14, wherein said zeolite binder crystals have an average particle size of from about 0.1 to about 1 micron.

16. The process recited in claim 4, wherein said silica-bound high silica zeolite extrudate contains from about 20 to about 50% by weight silica.

17. The process recited in claim 4, wherein said elevated temperature is in the range of from about 95° C. to 200° C.

18. The process recited in claim 17, wherein said (OH$^-$):(SiO$_2$) molar ratio is in the range of from about 0.05 to about 0.6.

19. The process recited in claim 3, wherein said zeolite binder crystals are intergrown and form at least a partial coating on said high silica zeolite crystals.

20. The process recited in claim 3, wherein said zeolite binder crystals have an average particle size that is less than the crystals of said high silica zeolite crystals.

21. The process recited in claim 3, wherein said high silica zeolite crystals have an average particle size greater than about 0.1 micron.

22. The process recited in claim 21, wherein said high silica zeolite is an aluminosilicate zeolite or a gallosilicate zeolite.

23. The process recited in claim 22, wherein said high silica zeolite and said zeolite binder have an intermediate pore size zeolite.

24. The process recited in claim 3, wherein said extrudable mass is extruded using a ram extruder.

25. The process recited in claim 3, wherein said extrudable mass is extruded using a screw extruder.

26. The process recited in claim 3, wherein the composition of said high silica zeolite has the following molar relationship:

$$X_2O_3:(n)YO_2,$$

wherein X is titanium, aluminum, iron, boron, gallium or mixtures thereof and Y is as silicon, tin, germanium or mixtures thereof and n has a value greater than 80.

27. The process recited in claim 26, wherein n has a value greater than 100.

28. The process recited in claim 3, where at least 90 percent of the exchangeable alkali ions of said high silica zeolite have been replaced by hydrogen ions.

29. The process recited in claim 28, wherein the hydrogen form of said high silica zeolite is prepared by ion exchanging ammonium ions for alkali ions present in said high silica zeolite and decomposing said exchanged ammonium ions.

* * * * *